United States Patent [19]

Takeuchi

[11] 3,825,967
[45] July 30, 1974

[54] BRUSH CONTROL DEVICE FOR VEHICLE CLEANING APPARATUS

[75] Inventor: Shigeo Takeuchi, Nagoya, Japan

[73] Assignee: Takeuchi Tekko Kabushiki Kaisha, Aichi-ken, Japan

[22] Filed: Apr. 25, 1973

[21] Appl. No.: 354,501

[30] Foreign Application Priority Data
May 19, 1972 Japan.............................. 47-49715

[52] U.S. Cl. ............................ 15/21 D, 15/DIG. 2
[51] Int. Cl. .............................................. B60s 3/06
[58] Field of Search............ 15/21 D, 21 E, DIG. 2, 15/53, 97

[56] References Cited
UNITED STATES PATENTS
3,516,105  6/1970  Weigele et al...................... 15/21 D Primary Examiner—Edward L. Roberts
Attorney, Agent, or Firm—Waters, Roditi, Schwartz & Nissen

[57] ABSTRACT

This invention relates to a control device for vehicle top cleaning apparatus of the type having first and second rotatable brushes horizontally supported on a portal frame structure by first and second brush arms mounted on the frame for swinging movement back and forth thereof. A first support shaft is associated with the first brush arm for rotation therewith and a second supported shaft is associated with the second brush arm for rotation therewith, and a clutch mechanism is arranged between said first and second support shafts. The clutch mechanism is engagable to cause said second brush arm to swing upwardly with the upward swing of said first brush arm and disengagable to allow said first and second brush arms to swing downwardly independently from each other.

1 Claim, 5 Drawing Figures (a)

(b)

(c)

(d)

BRUSH CONTROL DEVICE FOR VEHICLE CLEANING APPARATUS

BACKGROUND OF THE INVENTION

This invention relates generally to apparatus for cleaning vehicles such as automobiles of the type including a portal frame structure through which a vehicle progresses and more particularly to such apparatus of the type described including brush means designed to clean the top surfaces of a vehicle continuously and in an automatic fashion.

In the prior art of vehicle cleaning apparatus of the character described, at least one rotatable cylindrically shaped brush has been supported horizontally by means of rockable arms which are operable under the control of appropriate electric or fluid control means including limit switches, pneumatic cylinders or other components to cause the brush to follow the top contour of the vehicle being washed. Use of such control device, however, has involved high cost and been liable to cause trouble as the vehicle cleaning apparatus is ordinarily employed outdoors and makes use of large amounts of water for washing operation.

SUMMARY OF THE INVENTION

The present invention is designed to solve these problems previously encountered and has for its object the provision of a novel brush control device for a vehicle cleaning apparatus of the type described which is purely mechanical in nature, not including any elaborate and costly control means such as those previously employed, and hence inexpensive and substantially trouble-free and which enables a pair of rotatable cylindrically shaped brushes to move in a vertical plane in relation to each other and to the portal frame of the cleaning apparatus closely along the top contour of the vehicle being cleaned automatically under the pressure of contact between the vehicle and the individual brushes.

Another object of the present invention is to provide a brush control device of the character described which makes it possible to effectively clean, among others, the rear region of the vehicle, which ordinarily includes some recessed areas and has previously been relatively difficult to clean.

BRIEF DESCRIPTION OF THE DRAWINGS

The present invention will be described hereinafter in more detail with reference to the accompanying drawings, which illustrate one presently preferred embodiment of the invention and in which.

DESCRIPTION OF THE PREFERRED EMBODIMENT

Figure 1:
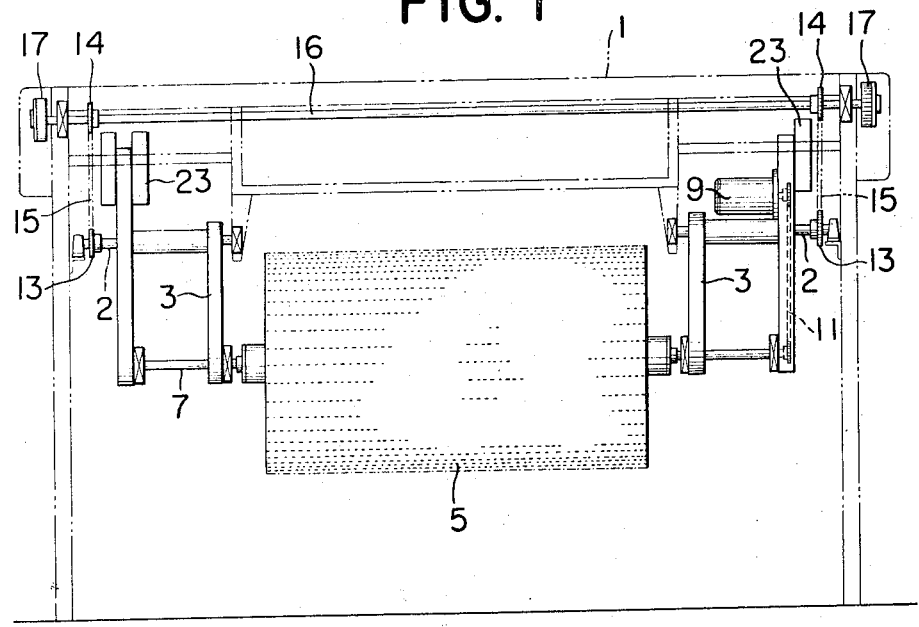
FIG. 1 is a front elevation of the embodiment.
Figure 2:
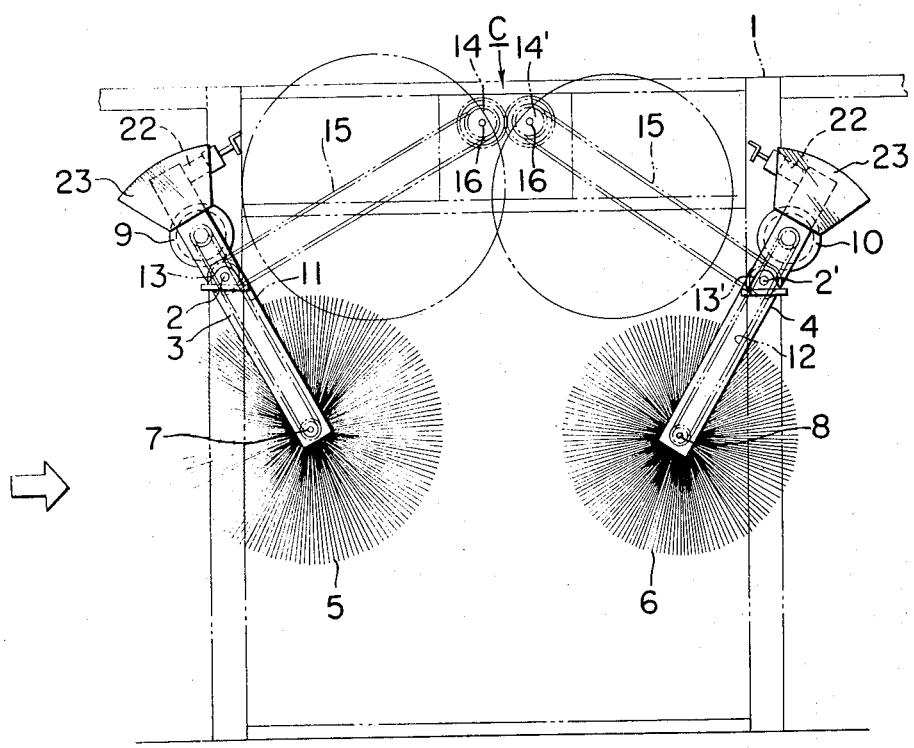
FIG. 2 is a side elevation of same.

Referring to the drawings and first to FIGS. 1 and 2, reference numeral 1 indicates the portal frame structure of the cleaning apparatus, through which a vehicle progresses and on which the brush control device of the invention is arranged. The brush control device includes a first pair of horizontal support shafts 2—2 and a second pair of horizontal support shafts 2'—2' which are rotatably mounted on the front and rear sides of the portal frame 1 and the two support shafts in each pair are spaced apart transversely of the direction of travel of the vehicle being washed and are aligned with each other. Rotatably mounted on the respective pairs of support shafts 2—2, 2'—2' are a first pair of crank-like brush arms 3—3 and a second pair of similar brush arms 4—4 which rotatably support horizontally extending brush shafts 7 and 8, respectively. A first rotatable cylindrically shaped brush 5 and a second rotatable cylindrically shaped brush 6 are mounted fixedly on respective brush shafts 7 and 8. A pair of drive motors 9 and 10 are mounted on one of the first brush arms 3 and on one of the second brush arms 4, respectively, to rotate the brush shafts 7 and 8 about the axes thereof through the medium of respective motion-transmitting mechanisms 11 and 12 arranged in the adjacent first and second brush arms 3 and 4.

Fixedly mounted on the first support shafts 2—2, which support respective first brush arms 3—3, are respective chain sprocket wheels 13—13, which are operatively connected with respective chain sprocket wheels 14—14 by means of endless chains 15—15. The latter sprocket wheels 14—14 are fixedly mounted on a first horizontal shaft 16 rotatably supported in the top portion of the frame structure 1. With this arrangement, rotation of the first support shafts 2—2 occurring with swinging motion of the first brush arms 3—3 is transmitted to the first horizontal shaft 16 through the chain-sprocket mechanisms 13-14-15. Similarly, the second support shafts 2'—2', supporting the second brush arms 4, have respective chain sprocket wheels 13'—13' fixedly mounted thereon with endless chains 15'—15' arranged to connect the sprocket wheels 13'—13' with respective chain sprocket wheels 14'—14', which are fixed to a second horizontal shaft 16' mounted on the frame structure 1 in parallel with the first horizontal shaft 16. Thus, rotation of the second support shafts 2'—2' occurring with swinging motion of the second brush arms 4—4 are transmitted to the second horizontal shaft 16' through respective sprockets 13'—13', chains 15'—15' and sprockets 14'—14'. The first and second horizontal shafts 16 and 16' mounted on the frame structure 1 in parallel with each other are operatively associated with each other by way of a clutch mechanism C, which is constructed as described below in detail.

Figure 3:
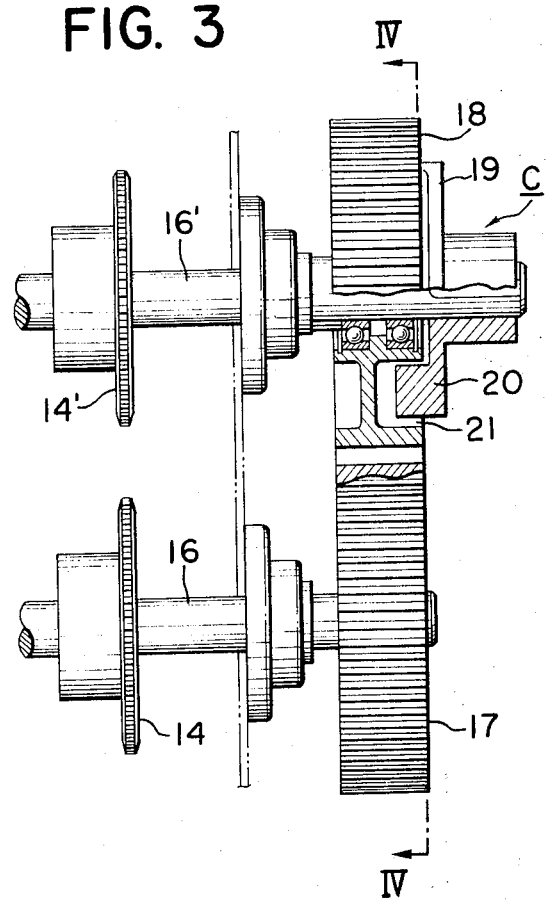
FIG. 3 is a fragmentary partly cutaway plan view of the clutch mechanism in the embodiment.
Figure 4:
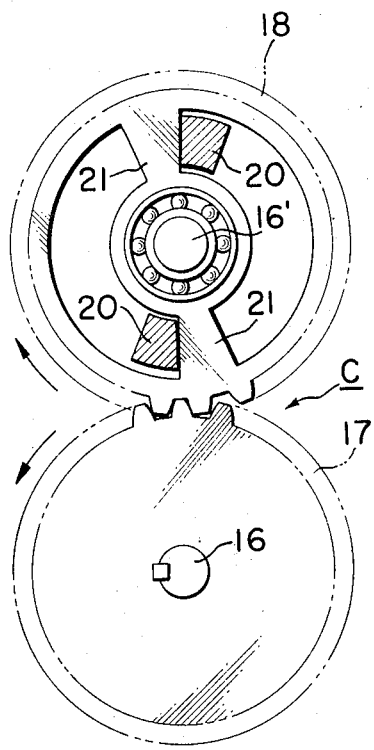
FIG. 4 is a view, partly in section, of the clutch mechanism, looking from the line IV—IV in FIG. 3.

Referring mainly to FIGS. 3 and 4, the first horizontal shaft 16 has a gear 17 fixedly mounted thereon for meshing engagement with another gear 18 which is mounted on the second horizontal shaft 16' for free rotation relative thereto. Fixed to the second horizontal shaft 16' is a clutch disc 19 which is formed with a pair of projections or pawls 20—20 in diametrically opposed positions for engagement with a pair of radial abutments 21—21 formed on the free gear 18 in diametrically opposite positions in an annular recess formed therein on the side adjacent to the clutch disc 19. Thus, upon rotation of the first horizontal shaft 16 in a counterclockwise direction as viewed in FIG. 4, the rotative torque is transmitted through the gear 17 fixedly mounted on the shaft to the free gear 18 on the second horizontal shaft 16' to cause clockwise rotation of the latter through the intermediary of the radial abutments 21—21 engaging the respective clutch pawls 20—20 and the clutch disc 19 itself.

Referring to FIG. 2, a pair of separate stop means 22—22 are arranged on the top portion of the frame structure 1 on the front and rear sides thereof for engagement with the top ends of the respective first and second brush arms 3 and 4 normally to hold the latter in positions downwardly inclined toward each other, as shown. In this figure and in FIG. 1, reference numeral 23 indicates couterweights secured to the top ends of the respective brush arms 3 and 4.

Figure 5:
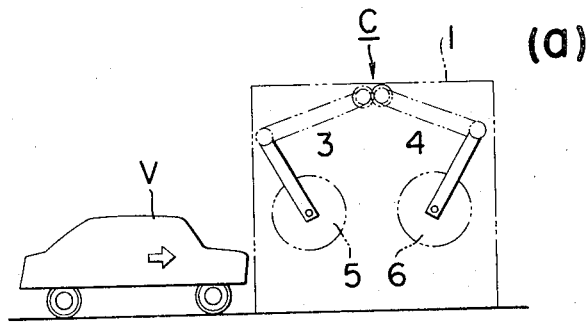
FIG. 5 diagrammatically illustrates the successive stages of cleaning operation of the apparatus embodying the present invention.
Figure 5:
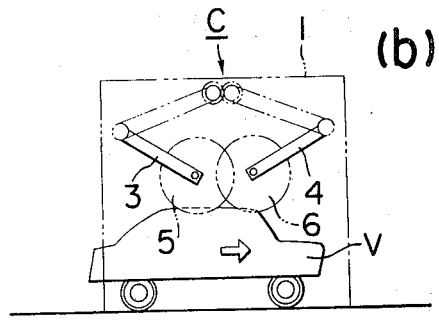
Figure 5:
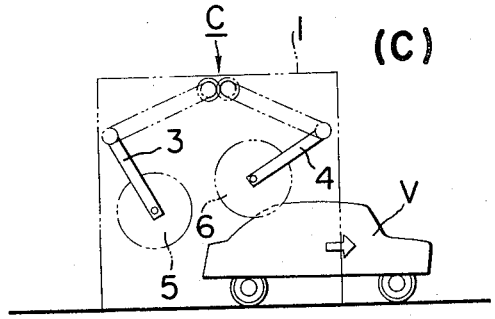
Figure 5:
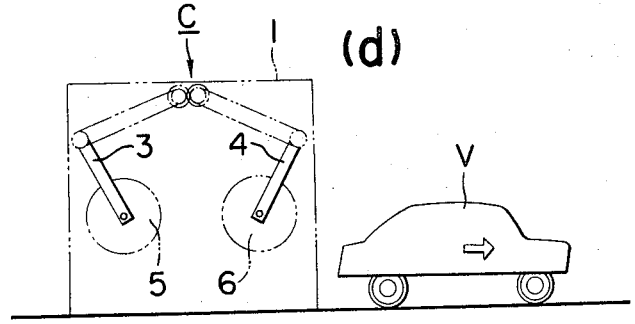

Description will next be made of the operation of the inventive device illustrated principally with reference to FIG. 5, in which reference character V indicates a vehicle being cleaned.

In cleaning operation of the apparatus, the vehicle V to be cleaned is advanced toward the frame structure 1 with the drive motors 9 and 10 held energized to rotate the first and second brushes 5 and 6 respectively in clockwise and counterclockwise directions as viewed in FIG. 5a. The advancing vehicle V first engages the first rotatable brush 5, causing the latter to proceed over the bonnet of the vehicle, and subsequently raises the brush onto the roof thereof. In this manner the first brush arms 3—3 are swung up to turn the respective support arms 2—2 counterclockwise together with the sprocket wheels 13—13 thereby to turn the first horizontal shaft 16 in the same direction through the medium of chains 15—15 and sprocket wheels 14—14. Obviously, the fixed gear 17 on the horizontal shaft 16 is caused simultaneously to turn counterclockwise as viewed in FIG. 4. The turning movement of the fixed gear 17 causes rotation of the clutch disc 19 through the free gear 18 and the radial abutments 21—21 in driving engagement with the clutch pawls 20—20. The resulting clockwise rotation of the second horizontal shaft 16' causes rotation of the second support shafts 2'—2' in the same direction through the medium of sprockets 14'—14', endless chains 15'—15' and sprockets 13'—13'. In this manner, the second brush arms 4—4, being formed integral with the respective second support shafts 2'—2', are swung upwardly in symmetrical relation to the first brush arms 3—3 as the latter are swung upwardly. In other words, the first and second rotatable brushes 5 and 6, being mounted on the first and second brush arms 3—3 and 4—4, respectively, are raised in unison from the level of the bonnet of the vehicle to the level of the roof thereof to clean the vehicle surface in succession, as shown in FIG. 5b.

As the vehicle V continues to progress, the first brush 5, reaching the rear corner of the roof of the vehicle, begins to descend along the inclined rear window thereof, causing the first brush arms 5 to swing down to rotate the first support shafts 2—2 and gears 17—17 in a clockwise direction and accordingly the free gears 18—18 in a counterclockwise direction. As will be readily understood, the radial abutments 21—21 formed on the free gear 18 are moved, on this occasion, in a direction away from the respective pawls 20—20 of the clutch disc 19 and with the clutch mechanism C thus released the rotation of the first horizontal shaft 16 is not transmitted to the second horizontal shaft 16', allowing the second brush 6 to continue to clean the roof of the vehicle while the first brush 5 descending by itself cleans the rear windows and the top of the trunkroom of the vehicle.

As the vehicle V further progresses, the second brush 6 reaching the rear corner of the roof of the vehicle, begins to descend along the inclined rear window thereof to cause the second support shafts 2'—2' and hence clutch disc 19 to turn counterclockwise, but, also in this case, the clutch mechanism C remains released as the pawls 20—20 of the clutch disc 19 are moved in a direction apart from the radial abutments 21—21 of the free wheel 18 and thus the second brush arms 4—4 are swung down independently of the first brush arms 3 without transmission of the rotation of the second horizontal shaft 16' to the first horizontal shaft 16.

It is to be noted at this point that the swing motion of the second brush arms 4—4 during the time the second brush 6 is descending along the rear window and trunkroom of the vehicle to clean these surfaces is effected in a counterclockwise direction, causing the second brush 6 to move in a direction closely to follow the vehicle so that the vehicle surfaces can be cleaned highly effectively despite of the recessed areas usually found in the rear region of the vehicle.

Finally, when the vehicle V leaves the frame structure 1 as shown in FIG. 5d, the first and second rotatable brushes 5 and 6 are both held in their initial position shown in FIG. 2.

It will be appreciated from the foregoing description that the brush control device of the present invention, being purely mechanical in nature and operable to control a pair of rotatable brushes for displacement along the top contour of a vehicle being cleaned without the need of any elaborate electric or fluid control means including limit switches or pneumatic cylinders, has various advantages that it can be fabricated with reduced cost, making the whole cleaning apparatus less expensive, and that it is sturdy enough to stand any harsh and severe use and substantially free from trouble.

According also to the present invention, the brush control device is particularly advantageous in that it makes it possible to clean any recessed areas of the rear portion of the vehicle, which were previously relatively difficult to clean, owing to the arrangement of the second rotatable brush 6 which is displaceable downwardly forwardly in the direction of travel of the vehicle being cleaned closely to follow the vehicle while operating to clean the rear portion thereof.

While one preferred embodiment of the present invention has been shown and described, it will be apparent to those skilled in the art that various changes and modifications may be made therein without departing from the spirit of the invention or the scope of the appended claim.

What is claimed is:

1. In a vehicle cleaning apparatus of the type having a portal frame structure through which a vehicle progresses, a top-cleaning brush control device comprising at least one first brush arm mounted on the portal frame for swinging movement back and forth thereof, at least one second brush arm mounted on the portal frame for swing movement back and forth thereof, a first rotatable brush horizontally supported by said first brush arm at the distal end thereof, a second rotatable brush horizontally supported by said second brush arm at the distal end thereof, a first support shaft associated with said first brush arm for rotation therewith, a second support shaft associated with said second brush arm for rotation therewith, and a clutch mechanism arranged between said first and second support shafts, said clutch mechanism being engageable to cause said second brush arm to swing upwardly with the upward swing of said first brush arm and disengageable to allow said first and second brush arms to swing downwardly independently from each other.

* * * * *